United States Patent [19]
Zerndt et al.

[11] Patent Number: 5,052,424
[45] Date of Patent: Oct. 1, 1991

[54] ELECTRICALLY OPERATED SERVO ACTUATOR WITH AUTOMATIC SHUT OFF

[75] Inventors: Norman E. Zerndt, Palatine; Cyril E. Bradshaw, Wheaton, both of Ill.

[73] Assignee: Eaton Corporation, Cleveland, Ohio

[21] Appl. No.: 553,296

[22] Filed: Jul. 16, 1990

[51] Int. Cl.[5] ............................................. F16K 31/04
[52] U.S. Cl. .................................. 137/1; 251/129.12; 310/68 B
[58] Field of Search ...................... 251/129.12, 129.11; 310/68 B

[56] References Cited

U.S. PATENT DOCUMENTS

| | | | |
|---|---|---|---|
| 2,203,233 | 6/1940 | Danish | 251/129.12 |
| 4,315,174 | 2/1982 | Doerr | 310/68 B |
| 4,715,580 | 12/1987 | Mueller | 251/129.12 X |
| 4,794,314 | 12/1988 | Janv et al. | 251/129.12 X |

Primary Examiner—Arnold Rosenthal
Attorney, Agent, or Firm—R. A. Johnston

[57] ABSTRACT

A two-position motorized servo actuator with automatic motor shut off at either position. The user remotely energized the motor with a two-position switch and the motor drives in rotation a floating lead screw journalled for both rotational and axial movement. A follower traverses the lead screw during rotation; and, a lever means moved by the follower is operative to perform a desired function, such as for example, open and close a valve. Upon the follower contacting a travel limit stop, the motor continues rotation of the lead screw which moves axially by threaded advancement in the follower, and the axial movement of lead screw is operative to toggle a switch and reverse the polarity of the power to the motor. If the motor is remotely energized, for reverse rotation by user movement of the two-position switch to its opposite position, the servo will operate to drive the follower to an opposite limit position.

14 Claims, 4 Drawing Sheets

ELECTRICALLY OPERATED SERVO ACTUATOR WITH AUTOMATIC SHUT OFF

BACKGROUND OF THE INVENTION

The present invention relates to servo driven valves and particularly to valves of the type employed for controlling flow of water or engine coolant to a heat exchanger for an occupied space such as the passenger compartment of a vehicle. Valves employed for passenger compartment heat exchangers or heater cores as they are often called are commonly of the butterfly vane type and heretofore the butterfly has been operated by a servo motor typically of the type employing a vacuum operated diaphragm connected via a linkage to the butterfly shaft.

Automotive heater core valves of the aforesaid type have the disadvantage that a source of vacuum is required to be supplied to the location of the vacuum motor for the valve; and, where it is desired to provide a heater core in the rear of a bus or passenger van, it is necessary to route vacuum lines for a substantial distance. Where a heater core valve is located in a position requiring long vacuum lines, the potential exists for breakage in the lines and leakage which would render the vacuum motor inoperative. Accordingly, it has been desired to replace vacuum motor operated heater core valves with electrically operated valves which eliminate the need for lengthy routing of vacuum lines. However, it has been proven costly in terms of the volumes encountered in mass production of automobiles to provide for an electrically operated servo driven water valve for a heater core in view of the cost of providing a means for sensing the position of the valve for generating a feedback signal to enable precise control of the valve position.

In certain applications, it has been desired to provide an electrically operated servo driven heater core water valve which operated only in one of two positions, e.g., either fully open or fully closed thereby eliminating the need for a valve position feedback signal. Where such a simple servo driven valve operation is desired, it has nevertheless proven difficult to provide a way or means of sensing the fully open or fully closed valve position and stopping the motor drive to the valve without employing costly plural travel limit switches or electronic or electrical means for sensing motor current or other parameters to determine the point at which the motor should be de-energized.

Thus it has long been desired to provide a way or means of providing an electrically operated two-position servo actuator which could be manufactured inexpensively in high volume mass production for automotive applications and which automatically cuts off the drive motor when the limit position is reached without the need for costly electronics, yet one vehicle could be pre-energized upon command by a single means.

SUMMARY OF THE INVENTION

The present invention provides an electrically operated servo actuator capable of operating between two positions, such as for example, a fully open or fully closed position when connected to operate a movable valve member. The servo motor is energized from a simple two-positions user actuated switch which may be conveniently located remote from the valve. The servo actuator of the present invention has been found particularly suitable for heater core water valves employed in automotive passenger compartment heaters where it is desired to locate the heater core in a remote location such as the rear of a bus or van passenger compartment.

The servo actuator of the present invention employs an electric motor having a worm and driven gear operable for rotating an axial lead screw with a threaded follower which traverses the lead screw and which is connected for moving a moveable means such as a lever or crank arm adapted for performing a desired function. As embodied in a fluid valve the crank arm is connected to a shaft for moving the valve member between an open and closed position. The axial lead screw is journalled for rotation on the valve body and is also free to move axially in the journals. Upon the threaded follower reaching a travel limit stop of movement in either direction on the lead screw, e.g., the open or closed position of a valve, operation of the motor is continued which causes the lead screw to move axially in the stopped follower.

A switch actuating means is axially fixed on the lead screw shaft and moves axially with the lead screw to cause actuation of a motor control switch which reverses the polarity of the electrical connections to the motor. Upon reversal of the electrical connections to the motor power to the motor is cut off and the servo motor remains inactive.

Upon the user moving the two-position remote control switch to the opposite position, the motor is again energized for operation in the reverse direction of rotation and drives the lead screw causing the follower to traverse the lead screw and move the valve to the opposite position, whereupon when the follower again reaches a second limit stop and the lead screw again begins axial movement by threaded advancement in the stopped follower causing the switch actuating means to actuate the motor control switch to the opposite position to again reverse polarity of the motor power. The motor remains off until the user again reverses the remote switch position.

The present invention thus provides a manually energized motor driven servo actuator which employs a floating lead screw having a follower which traverses the lead screw for driving the desired function such as a movable valve member. When the follower reaches its limit stop the screw continues rotating and moves axially by threaded advancement in the follower for toggling a motor control switch to reverse the polarity of current to the drive motor. The motor remains off until again energized for reverse rotation by a remote user actuated switch. The present invention thus provides a unique and novel electrically operated servo driven valve which operates between a fully open and fully closed position upon user actuation of a remote switch and provides for internal mechanical sensing of the closed or open position to toggle a switch for terminating the motor drive by reversing the polarity of the motor power. Remote reverse energization is accomplished, as desired, by user reversing of a two-position switch.

It is an object of the present invention to provide an electrically operated servo actuator employing a screw means with a follower thereon for traversing the screw means to perform a desired function, such as move a lever or crank means. It is a part of said object to have the servo actuator employ mechanical stops to limit the travel of the threaded follower. Upon the follower contacting either limit stop, the motor continues rotation of the screw means and causes the screw means to move axially in the stopped follower for actuating a motor control switch to reverse the polarity of the motor power supply to stop the motor until a remote user actuated switch is thrown to reconnects the motor for re-energization in the reverse direction.

It is a further object of the present invention to provide an electrically operated two-position servo actuator employing a motor driven axially floating screw means with a threaded follower thereon operable upon energization of the motor from a remote two-position user control switch to traverse the screw means between for performing a desired function, and upon the follower upon contacting a travel limit stop the motor continues to rotate the screw means which moves axially in the stopped follower for actuating a switch to reverse the polarity of the electrical connection of the motor and thereby terminate motor operation until the user moves a remote two-position switch and thereby reconnects the motor for reverse operation.

It is a further object of the present invention to provide an automatic position limiting electric servo actuator which employs a motor driven rotating axially floating lead screw traversed by a threaded follower for moving a crank shaft connected to a valve and upon the follower contacting a travel limit stop the motor continues to rotate the lead screw to move axially in the stopped follower for actuating a switch to reverse the polarity of the electrical connection for the motor which remain off until a remote user switch is actuated to reverse the polarity of the power and the threaded follower is operatively connected to move a valve member adapted for controlling water flow to a heat exchanger in an automotive passenger compartment heating system.

DETAILED DESCRIPTION

Referring to FIGS. 1 through 4, the servo actuator of the present invention is shown as embodied in a valve assembly indicated generally at 10 which has a valve body or housing 12 defining a fluid inlet 14 communicating with a valving passage 16 having an outlet 18. Inlet 14 has a nipple 20 provided thereabout for attachment to a fluid supply conduit (not shown); and, the outlet has a flange 22 provided thereabout which is adapted for connection to a fluid receiving appliance as for example an automotive passenger compartment heater core. The housing 12 has a cavity 26 formed therein and surrounded by a wall 24 formed integrally therewith. Cavity 26 has a suitable cover 28 provided thereover, which has been removed in FIG. 1 for exposing the driving and switching mechanism disposed in the cavity 26 as will hereinafter be described in greater detail.

Valving passage 16 has disposed therein a movable valving member 30 preferably in the form of a vane or butterfly member which is attached by any convenient means, as for example weldment, to a shaft 32 journalled in the housing. Butterfly 30 extends transversely across valving passage 16 and through the wall thereof has an exterior crank portion 34 formed thereon and sealed through the wall of the valving passage by a suitable seal ring 36.

Housing 12 has a motor cover portion 38 formed integrally therewith and which forms a cavity 40 in which is received a motor 42 which in the present practice for automotive heater applications comprises a motor operable on a twelve volt DC supply and which has a drive worm 44 provided on the shaft thereof. A drive screw means indicated generally at 46 is provided on a shaft 48 which extends across the width of cavity 26 and has the ends thereof journalled in blind bores 50,52 formed in the opposite sides of the wall 24 in the housing, which bores permit both axial and rotary movement of the shaft 48. Screw means 46 includes an axial lead screw 54 having a traversing follower 56 preferably threadedly engaged thereon which moves between the rightward position indicated in dashed outline in FIG. 1 and FIG. 3 and the leftward position indicated in solid outline in FIG. 1 and FIG. 3.

Figure 1:
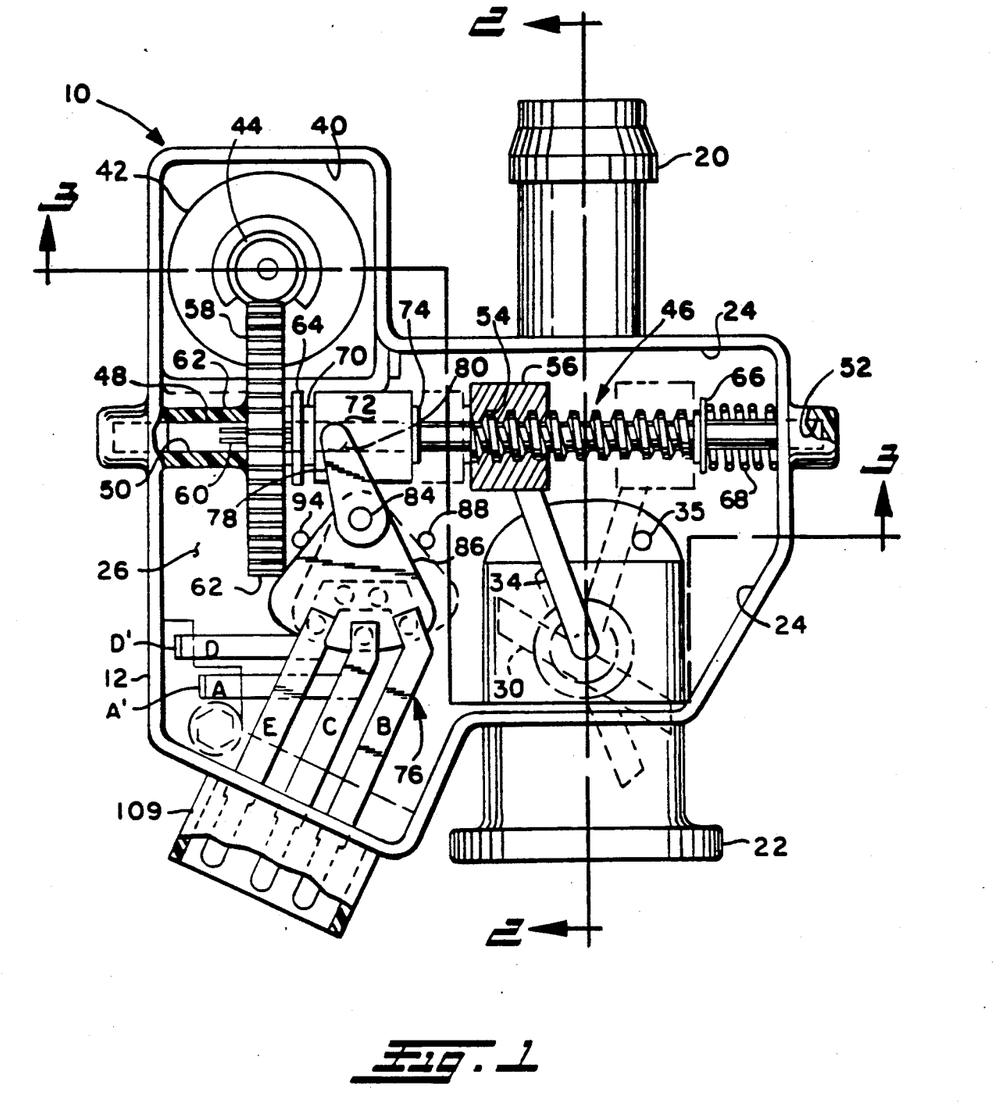
FIG. 1 is a plan view of the invention servo actuator embodied in a valve assembly wit the cover of the housing removed.
Figure 2:
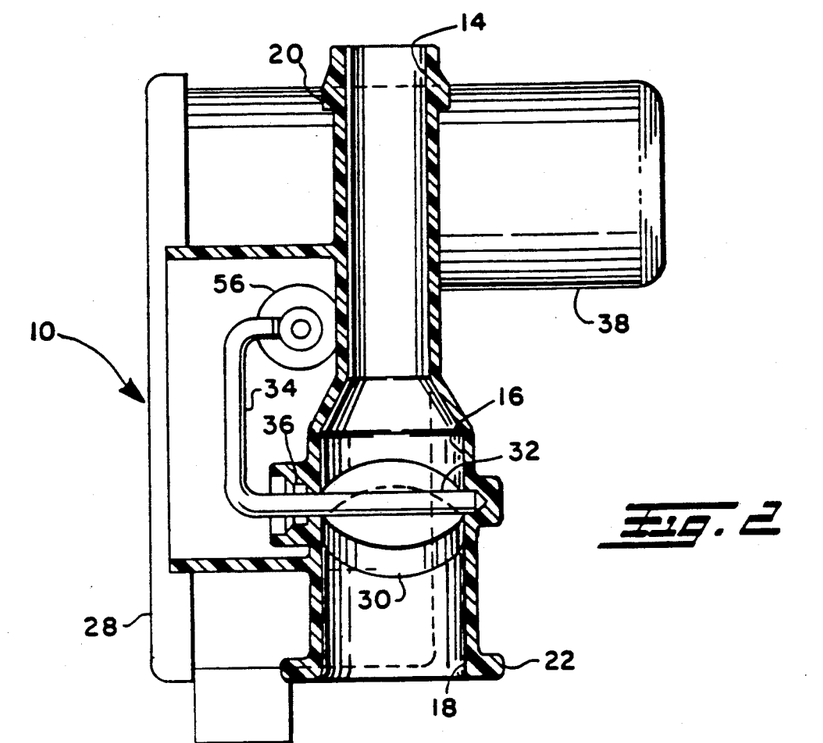
FIG. 2 is a section view taken along section-indicating lines 2—2 of FIG. 1.
Figure 3:
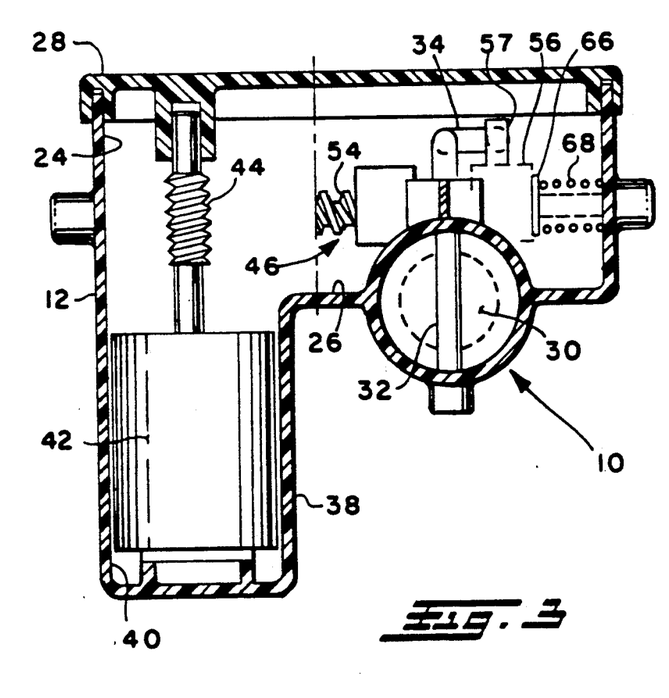
FIG. 3 is a section view taken along section-including lines 3—3 of FIG. 1.

The follower 56 has a post 57 extending therefrom which is connected to the end of a suitable movable means for performing a desired function such as, for example, crank arm 34 such that traverse or movement of the follower 56 axially along lead screw 54 causes movement of the crank arm 34, shaft 32 and thus valve member 30. It will be understood that the crank arm 34 as shown in solid outline in FIGS. 1 and 3 is in the position whereby the valve member 30 is in the fully closed position. When the follower 56 is in the rightward position shown in dashed outline in FIGS. 1 and 3, it will be understood that the valve member 30 is in the fully open position. Although the follower 56 has been illustrated as connected to a crank arm 34 for operating a valve, the follower may have any sort of mechanical, electrical or optical device moveable therewith, such as for example, a magnet or coil for magnetomotive function, or a photo detector or light source for optically detectable function.

Shaft 48 has a driven gear 58 received thereover and in rotary driving engagement therewith in a manner permitting axial sliding movement between shaft 48 and gear 58. In the present practice the gear engages shaft 48 in a suitable expedient as for example a spline 60 or flat portion sufficient to enable gear 58 to rotate the shaft 48 yet permit the shaft to slide axially within the gear. Gear 58 has the outer peripheral teeth 62 thereof engaged and driven by the teeth of worm 44. Gear 58 is maintained at a fixed axial station coincident with the worm 44 on one side by boss 62 provided in the housing in which is formed the journal 50 and on the other side by a rib or stanchion 64 extending from the bottom surface 26 of the cavity.

Shaft 48 has at the righthand end thereof a retaining washer or snap ring 66 provided thereon against which is registered one end of a spring 68 with the opposite end of the spring registered against the wall 24 of the housing for urging the shaft 48 in a leftward direction. A second washer or snap ring 70 is provided on shaft 48 adjacent the stanchion or rib 64 such that the snap ring 70 registers against the righthand edge of the rib 64 to thereby limit leftward movement of the shaft 48.

Referring to FIG. 1, a collar means 72 is received over shaft 48 and is freely rotatable thereon and positioned axially between snap ring 70 against which the left end of collar means 72 is registered, and a third snap ring 74 provided on shaft 48 at the righthand end of collar 72. The collar means 72 has a recess or other suitable engagement surfaces provided therein (not shown in FIG. 1) which is adapted for connection thereto and to provide for transmitting axial movement thereof. It will be understood that a bifurcated member, such as a fork or other suitable expedient may be substituted for collar 72.

Figure 4:
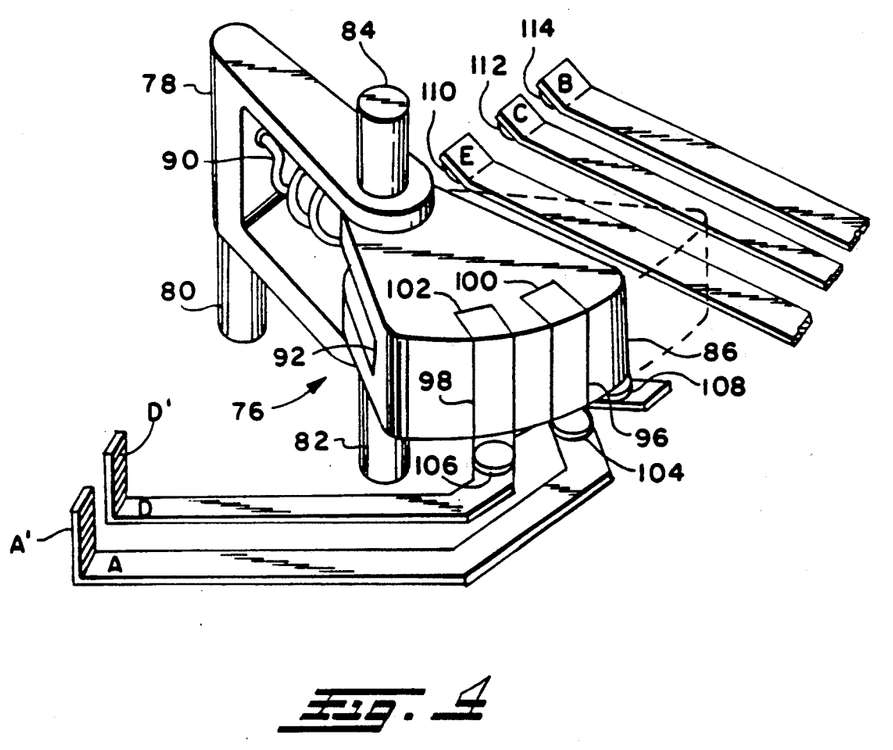
FIG. 4 is a somewhat perspective exploded view of the snap acting motor control switching arrangement of FIG. 1.

Referring to FIGS. 1 and 4, assembly 10 has a motor control switch means indicated generally at 76 which includes a yoke shaped toggle member 78 having a pin or lug 80 extending downwardly therefrom and which engages the aforementioned recess provided in the collar means 72.

Alternatively, member 78 could be formed with a forked portion engaging shaft 48 between snap rings 74,70 in place of pin 80 and collar means 72, or other suitable mechanical connection. Toggle member 78 has open ends thereof apertured to have received therethrough pins 82,84 which extend inwardly thereof to engage respectively apertures in opposite sides of a switch member 86 to permit relative pivotal movement between the toggle member 78 and the switch member 86.

An over-center spring 90 has one end attached to toggle member 78 and the other member attached to switch member 86 in the slot 92 provided therein. The pin or lug 82 is received in a recess (not shown) provided in the surface 26 of the housing and the pin or lug 84 is registered in a bore or recess (not shown) provided on the undersurface of the housing cover 28. The switch member 86 and the toggle member 78 both are thus pivoted about the lugs 82,84 which remain stationary with respect to the housing.

Left and right limit or stop pins 88,94 are provided on the housing and vertically upstanding from the surface 26 of the cavity for limiting the leftward and rightward pivotal movement of the switch member 86 about the center of lug 84. Referring to FIG. 1, switch member 86 is shown in its leftward pivoted position in solid outline as registered against stop pin 94 with the spring 90 over-center on the left side of pivot lug 84 and is in this position when collar means 72 is in the position shown in solid outline in FIG. 1. It will be understood that when collar 72 moves rightward to the position shown in dashed outline in FIG. 1, spring 90 passes over the center of pivot lug 84 and toggles the switch member 86 to a RIGHTWARD position shown in dashed outline in FIG. 1 so that the switch member 86 is registered against the rightward stop pin 88. Switch member 86 has provided on the outer edge thereof a pair of wrap-around contact strips 96,98 which have the end portions thereof wrapped over the upper and lower surfaces of the switch member 86. As denoted respectively by reference numerals 100,102 the end portions along the upper surface of switch member 86 are shown in FIG. 4. It will be understood that the opposite ends of the contact strips 98,96 are folded under along the undersurface of the switch member 86 in a manner similar to the upper end 100,102.

Referring to FIGS. 1 and 4, a pair of motor connecting contact strips denoted by the reference characters A and D in FIGS. 1 and 4 are disposed along the surface 26 of the cavity; and, each of strips A and D has one end thereof upturned at generally right angles denoted A', D' respectively and adapted for connection thereto by a lead wire from motor 42. Although the motor leads have not been illustrated for the sake of clarity, it will be understood that for twelve volt DC operation, one lead comprising the motor ground would connect to one of the terminal strips at A' or D'; and, the other lead comprising the motor supply voltage lead would connect to the other of the terminal A' or D' by any suitable expedient such as a push-on connector or by soldering.

The end of terminal strip A terminating adjacent the switch member 86 has the end thereof disposed such that when switch member 86 is in the leftward position shown in solid outline in FIGS. 1 and 4, a contact 104 provided on the end of strip A makes electrical contact with the undersurface of strip 96. Terminal strip "D" has a somewhat serpentine configuration in the region of switch member 86 such that a contact 106 is disposed directly beneath contact strip 98 for making contact with the undersurface thereof; and, a second contact 108 is disposed at the end of strip D and spaced from stationary contact 104 and movable contact strip 96 on the opposite side as stationary contact 106.

Referring to FIGS. 1 and 4, a plurality of spaced generally parallel disposed contact strips are provided and denoted in the drawings by reference characters B, C and E and which extend inwardly into cavity 26 from an exterior electrical connector shroud portion 109 provided on the exterior of the wall 24 of housing 12. Strip E has a contact 110 provided at the end thereof on the undersurface and disposed immediately above the portion 102 of strip 98 for contact therewith. Strip C similarly has a contact 112 provided at the end thereof on the undersurface and which is disposed immediately above the portion 100 of contact strip 96 on switch member 86 for electrical contact therewith when the switch 86 is in the position shown in FIGS. 1 and 4 in solid outline. Terminal strip B also has a contact 114 provided at the end thereof on the undersurface and which is disposed directly above the stationary contact 108 at the end of terminal strip D. With switch member 86 in the position shown in solid outline in FIGS. 1 and 4, which is the leftward limit position of the switch against stop 94, electrical connection is made between terminal strip D via contact 106 strip 98 and contact 110 with terminal strip E. Electrical contact is also made between terminal strip A through contact 104, switch contact strip 96 and contact 112 with terminal strip C.

Referring to FIGS. 1 and 4, when the switch member 86 is moved rightward about the center of pin 84, to the limit position shown in dashed outline and against stop pin 88, the contact strip 96 has its upper portion 100 in contact with the electrical contact 114 on terminal strip B; and, the undersurface of contact strip 96 is in electrical contact with stationary contact 108 on stationary strip D. With switch member 86 in the rightward position shown in dashed outline, terminal strip 98 on switch member 86 makes contact on its undersurface with stationary contact 104 on strip A and contact 112 on terminal strip C. The action of the motor control switch means 76 is thus that of a double pole double throw switch which effectively reverses the polarity of the power connection to the motor 42 at terminals A', D'.

Figure 5:
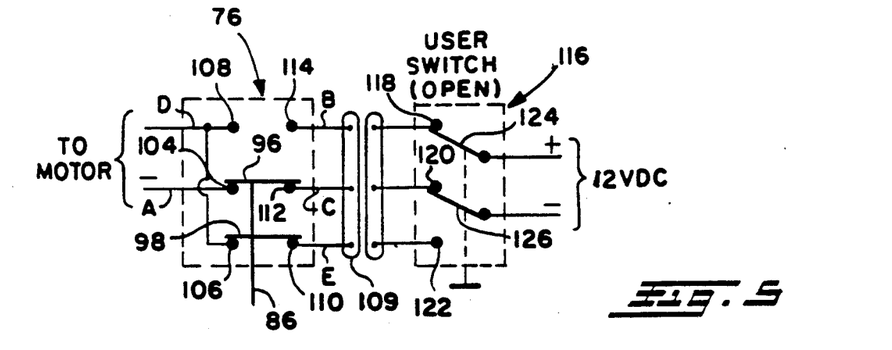
FIG. 5 is an electrical schematic of the system switching for the valve with the user remote switch in the OPEN position with the motor switched "OFF"

Referring to FIG. 5, the operation of the motor control switch 76 is shown schematically in conjunction with a remote user switch indicated generally at 116, which as contact 118 thereof is connected through electrical connector 109 to terminal strip B to contact 114.

Switch 116 has a movable switch blade member 124 which is connected to the positive lead of the twelve volt DC supply. Switch blade 124 is user movable between a position closing against contact 118 and a position closing against an opposing stationary contact 120 which is connected through connector 109 and terminal strip C to contact 112. Switch 116 has a second switch blade member 126 which is connected to the negative lead of the twelve volt DC supply. Blade member 126 is user movable, simultaneously with blade 124, from a position closing against stationary contact 120 to a position closing against an opposing stationary contact 122, which is connected through connector 109 and terminal strip E to stationary contact 110 of the switch 76.

Figure 7:
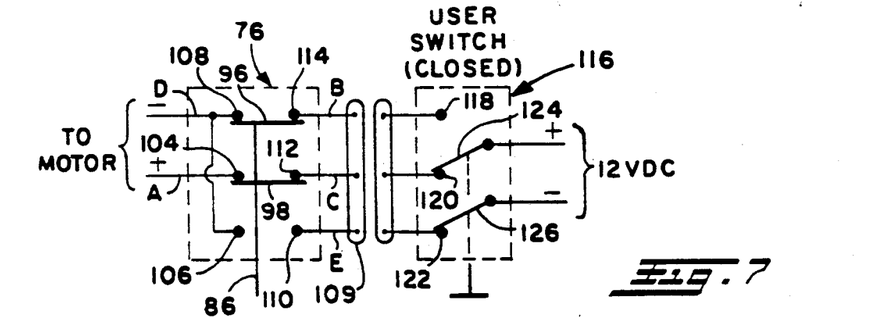
FIG. 7 is a view to similar to FIG. 5 with the valve in the CLOSE position and the motor switched "OFF"

Referring to FIG. 5, the user switch 116 is shown in the first or closed position with the blade members 124,126, positioned to close against contacts 118,120 respectively to apply the negative lead of the twelve volt DC supply through terminal strip C and closed contact blade 96 of switch 76 through terminal strip A to the motor. However, the connection between the positive side of the twelve volt DC supply via switch blade member 124, contact 118, terminal strip B and contact 114 is broken in view of the lowered position of the switch blade member 96 of switch 76. With reference to FIG. 5, the user has moved switch 116 to the closed position, and the motor has operated to cause the lead screw means 46 to rotate causing the follower 56 to traverse to the lefthand position shown in solid outline in FIG. 1 and 3 until the butterfly 30 has contacted wall 16 stopping movement of the crank arm 34 and follower 56 with the valve 30 fully closed. The motor continues to rotate the lead screw means 46 which causes shaft 48 to move axially to the right by virtue of its threaded engagement with the now stationary follower 56, thereby moving collar means 72 rightward to be positioned as shown in dashed outline in FIG. 1. The rightward movement of collar means 72 causes the switch 76 to toggle, moving switch member 86 to the position shown in dashed outline in FIGS. 1 and 4 resulting in the switch contact configuration shown in FIG. 7.

Figure 8:
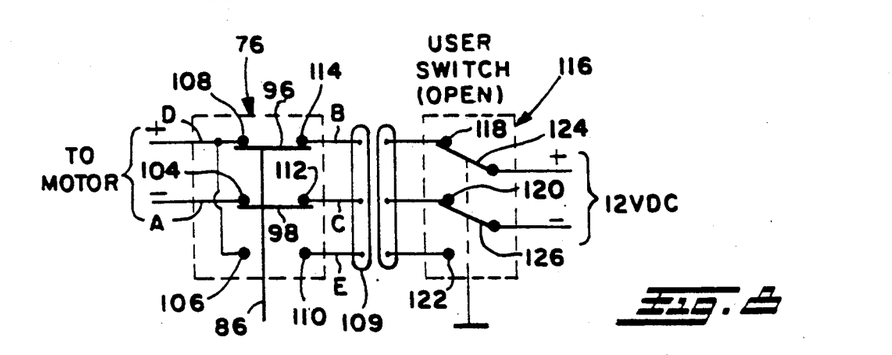
FIG. 8 is a view similar to FIG. 5 with the user switch in the "OPEN" position and the motor driving to OPEN the valve.

The servo actuator remains in the condition described above with respect to FIG. 7, with the valve member 30 in the closed position, until the user again actuates switch 116 to the second or open position as shown in FIG. 8. As soon as the user moves switch 116 to the position shown in FIG. 8, contact of the blade 124 with contact 120 is broken and the blade 124 closes against contact 118 connecting the positive side of the twelve volt DC supply through connector 109 to terminal strip B and to contact 114. Simultaneously therewith the movable blade member 126 of switch 116 is moved away from contact 122 and closes against contact 120 thereby connecting the negative side of the twelve volt DC supply through connector 109 and terminal strip C to stationary contact 112 of switch 76. Switch 76 has remained in the position shown in FIG. 7; and, in this position power is applied to the motor through switch contact 104 and terminal strip C to the negative or ground side. The positive side of the twelve volt DC supply is applied through switch blade member 96 and stationary contact 108 to the positive terminal of the motor to cause reverse rotation of the motor. As the motor rotates in a reverse direction, the threaded follower 56 moves in a rightward direction to the position shown in dashed outline in FIGS. 1 and 3, whereupon the crank arm 34 is moved to the position shown in dashed outline and the butterfly valve member 30 has moved to the OPEN position against stop 35 stopping movement of the crank arm 34 and the follower 56.

The motor continues to rotate causing the screw means 46 to traverse axially leftward and moving collar 72 leftward to the position shown in solid outline. As the collar 72 moves leftward, the switch 76 toggles and the switch member 86 snaps to the position shown in solid outline in FIGS. 1 and 4 and against the stop pin 94.

The snap action of the switch causes the contacts to move to the position shown in FIG. 5, whereby contact strip 96 has broken contact between strips B and D and has closed against contacts 104,112 to connect the negative side of the motor through terminal strip C and connector 109 stationary contact 120 of switch 116. Contact strip 98 has broken contact with terminal strips A and C and has closed against contacts 106,110 connecting the positive side of the motor through terminal strip D and terminal strip E and through connector 109 to the terminal 122 of switch 116 which remains in the open position of FIG. 5 and opens the positive side of the twelve volt DC supply. So long as the switch 116 remains in the position shown in FIG. 5, the movement of the switch 86 of motor control switch 76 to the position shown in FIG. 5 causes opening of the electrical connection to the motor and the motor ceases to run leaving the valve in the fully open position.

Figure 6:
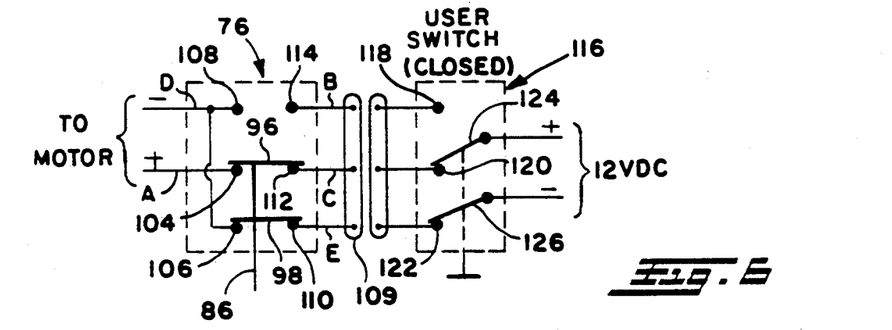
FIG. 6 is a view similar to FIG. 5 with the user remote switch in the CLOSE position and the motor driving to open the valve.

Referring to FIG. 6, the user switch 116 has been thrown from the position shown in FIG. 5 to the downward position closing contact blade 124 against contact 120 and connecting the positive side of the twelve volt DC supply through connector 109 to terminal strip C and stationary contact 112 of switch 76. The switch 76 remains in the position shown in FIG. 6 and terminal strip 96 makes contact between stationary contact 112 and contact 104 to connect terminal strip A to the positive side of the twelve volt DC supply.

The blade 126 of switch 116 has been simultaneously moved to the position closing against stationary contact 122 to connect the negative side of the twelve volt DC supply through connector 109 and terminal strip E to stationary contact 110 of switch 76. The contact strip 98 of switch 76 makes contact between the stationary contact 110 and stationary contact 106 of terminal strip D thereby connecting the negative side of the twelve volt DC supply and effects reverse rotation of the motor, which causes rotation of screw means 46. The follower 56 begins to move leftward from the position shown in dashed outline in FIG. 1 toward the position shown in solid outline in FIG. 1 moving the crank arm 34 toward the position shown in solid outline in FIGS. 1 and 3 to again fully close the valve member 30.

The present invention thus provides a unique and novel electrically operated servo actuator which upon user remote energization automatically terminates operation upon reaching the limits of either of two positions.

The servo actuator employs motor driven screw means and a threaded follower which traverses the screw means during rotation thereof to move between either of two limit positions dependent upon the direction of rotation of the screw means for performing a desired task or function. Upon the threaded follower reaching either of the limit positions, the motor continues rotation, the screw means which moves axially in the stopped follower and effects toggling of a switch which breaks the electrical connection to the motor. The servo actuator will remain in this condition until the a user actuated remote two-position switch is actuated to close the circuit in a reverse polarity condition to effect motor operation in the reverse direction to cause the follower to traverse to the opposite limit position whereupon the motor continues to rotate the screw means which moves axially in the follower to toggle a switch to again break reverse the polarity of the electrical connection to the motor thus cutting off power to the motor until the remote position is moved to its opposite position by the user.

The present invention finds particular application in an arrangement where the follower is connected for opening and closing a valve member for controlling flow of fluid in a valving passage. In particular the automatically limiting two-position servo actuator of the present invention has application for remotely controlling the opening and closing of a water valve adapted for controlling flow to a heat exchanger in a vehicle passenger compartment where the user control switch is located remotely from the valve.

Although the invention has hereinabove been described with respect to the illustrated embodiments it will be understood that other embodiments are contemplated and the invention is capable of modification and variation and is intended as limited only by the following claims.

We claim:

1. An electrically operated valve assembly comprising:
   (a) body means defining a valving passage having valve seating surfaces therein and an inlet and outlet;
   (b) a valve member disposed in said valving passage and movable therein between a position closed against said seating surfaces preventing flow between said inlet and said outlet and any one of a plurality of open positions permitting flow between said inlet and outlet;
   (c) valve shaft means mounted on said body means and operative upon being rotated for effecting said movement of said valve means;
   (d) lead screw means journalled for rotational and axial movement on said housing means;
   (e) motor means mounted on said body means and operable upon electrical energization to effect said rotational movement of said lead screw means;
   (f) follower means engaging said lead screw means and operable to traverse axially therealong upon said rotational movement of said lead screw means, said follower means operatively connected for, upon said axial traverse, effecting said rotation of said valve shaft means;
   (g) switch actuating means disposed on said lead screw means for axial movement therewith;
   (h) switch means including movable actuator means operably connected for movement by said switch actuating means and operative upon movement between a first position and a second position;
   (i) first stop means wherein upon energization of said motor means and said movement of said follower means in the direction effecting opening of said valve means and contact with said first stop means, said motor means continues rotation of said lead screw means and causes said lead screw means to move axially in said follower means causing said movable switch actuator means to move to said first position and whereupon said switch means is operable reverse the polarity of the power to said motor means;
   (j) second stop means wherein upon energization of said motor means in a reverse direction and movement of said follower means in the direction effecting closing of said valve said motor means continues rotation of said lead screw means causing said lead screw means to move axially in said follower means causing said movable switch actuator means to move to said second position whereupon said switch means operable again reverse the polarity of the power to said motor means.

2. The valve assembly defined in claim 1, wherein said switch means has a snap action.

3. The valve assembly defined in claim 1, wherein said switch means has a snap acting toggle mechanism which goes over-center when said switch actuator means is moved between said first and second positions.

4. The valve assembly defined in claim 1, wherein said second stop means comprises said valve seating surface.

5. A method of automatically controlling movement of a fluid flow valve mechanism between an open and closed position comprising the steps of:
   (a) providing a movable fluid valve mechanism and energizing an electric motor and driving a screw and traversing a follower for moving the valve mechanism;
   (b) mechanically limiting the traverse of said follower valving mechanism;
   (c) continuing driving said screw after said mechanical follower limiting and permitting said screw to thereupon move axially with respect to said follower;
   (d) actuating a switch in response to said screw moving axially and reversing the polarity of the power to said motor.

6. A self-limiting two-position servo actuator comprising:
   (a) body means having screw means journalled thereon for rotation and axial movement with respect thereto;
   (b) motor means operable upon electrical energization of one polarity to rotate said screw means in one direction, and upon electrical energization of opposite polarity to rotate said screw means in the opposite direction;
   (c) follower means engaging said screw means and operable for axially traversing said screw means upon rotation thereof between first and second positions;
   (d) moveable means connected to said follower means and operably connected for, upon traverse of said follower means, to be moved thereby to perform a desired function;
   (e) stop means operable to limit the traverse of said follower means;

(f) switch means including actuator means therefor, said switch means operable upon movement of said actuator means between a first and second position to effect switching of power to said motor means, wherein upon remote energization of said motor means and rotation of said screw means said follower means traverses said screw means and contacts said stop means and said motor means continues rotation of said screw means and effects axial movement of said screw means in said follower means to cause movement of said switch actuator means between said first and second position to effect de-energization of said motor means.

7. The servo actuator defined in claim 6, wherein said switch means is operative to reverse the polarity of electrical power connection to said motor means.

8. The servo actuator defined in claim 6, further comprising in combination a remote switch means user actuatable for re-energizing said motor means after said screw means has caused said termination of power to motor means, said remote switch means operable to effect reverse rotation of said motor means.

9. The servo actuator defined in claim 6, wherein said motor means includes gear means mounted for rotation at a fixed position on said body means for driving said screw means, said gear means permitting sliding movement of said screw means with respect thereto.

10. The servo actuator defined in claim 6, further comprising in combination a valving passage having an inlet and outlet with a valve disposed therein for movement between an open and closed position with said lever means operably connected to effect said movement of said valve.

11. A method of operating a two-position servo actuator comprising the steps of:
 (a) providing a motorized lead screw journalled for rotational and axial movement;
 (b) providing a two-position remote use power switch operable upon actuation from one position to the other to reverse polarity of a power supply connected thereto and moving said user switch to one position and energizing said motor for rotation in one direction; and rotating said lead screw in one direction;
 (c) traversing said lead screw means with a follower and using said traverse to perform desired function;
 (d) stopping the traverse of said follower at a desired limit and continuing rotation of said screw and permitting said screw to advance axially in said stopped follower and to move a switch to reverse the polarity of the power to said motor.

12. The method defined in claim 11 further comprising the step of user moving said remote switch to the other position for energizing said motor for reverse rotation.

13. The method defined in claim 11, wherein the step of using said traversing movement to perform a function includes the step of moving a valve member for controlling flow in a passage.

14. A system for remotely controlling an electrically operated valve comprising:
 (a) a valve body means having a flow passage communicating with an inlet and outlet;
 (b) a valve member disposed in said passage and moveable between a first position preventing and a second position permitting fluid flow from said inlet to said outlet;
 (c) a lead screw means journalled for rotary and axial movement on said body means;
 (d) motor means operable upon energization to impart said rotary movement to said screw means;
 (e) follower means energizing said screw means and operable upon said rotary movement to traverse said screw means;
 (f) stop means disposed on said body means and operable to limit said traverse of said follower means;
 (g) motor control switch means disposed on body means and operable upon actuation to reverse the polarity of the electrical power connection to said motor means;
 (h) switch actuator means associated with said screw and operable upon said screw means for actuating said switch means;
 (i) remote switch means disposed remotely with respect to said body means, said remote switch means operably connected for, upon user actuation, reversing the polarity of electric power to said motor control switch means; and
 (j) means operatively responding to said traverse of said follower means to perform a desired function, wherein upon user actuation of said remote switch means, said motor means is energized to said screw means rotary motion in one direction of rotation, said follower means experiences said traverse and upon said follower means contacting said stop means said screw means continues said rotary movement and advances axially in said stopped follower means whereby said actuator means actuates said motor control switch means for said reversing of said polarity of the motor power, for stopping said motor, said motor remaining stopped until the remote switch is again user actuated for effecting reverse energization of said motor means.

* * * * *

UNITED STATES PATENT AND TRADEMARK OFFICE
CERTIFICATE OF CORRECTION

PATENT NO. : 5,052,424
DATED : October 1, 1991
INVENTOR(S) : N. E. Zerndt, et al.

It is certified that error appears in the above-identified patent and that said Letters Patent is hereby corrected as shown below:

Column 10, Line 12: operable <u>to</u> reverse the polarity of the power to said motor means;

Column 10, Line 22: switch means <u>is</u> operable <u>to</u> again reverse the polarity of Column 10, Line 41: <u>and</u> valving mechanism Signed and Sealed this Fourteenth Day of September, 1993

Attest:

BRUCE LEHMAN

Attesting Officer

Commissioner of Patents and Trademarks